(No Model.)
M. HALLER.
Ear Piercer.
No. 231,036.  Patented Aug. 10, 1880.
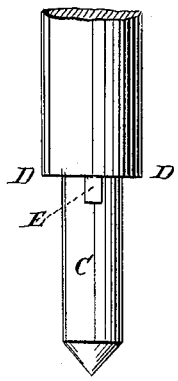
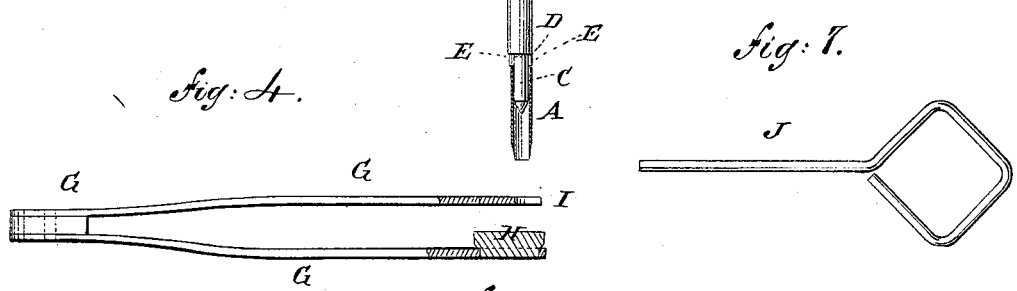
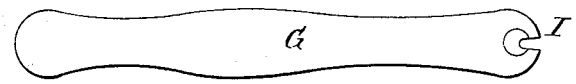
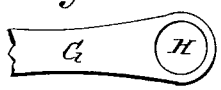
WITNESSES:
Chas. Nida
C. Sedgwick
INVENTOR:
M. Haller
BY Munn & Co
ATTORNEYS.

United States Patent Office.

MARTIN HALLER, OF ANN ARBOR, MICHIGAN.

EAR-PIERCER.

SPECIFICATION forming part of Letters Patent No. 231,036, dated August 10, 1880.

Application filed April 13, 1880. (No model.)

*To all whom it may concern:*

Be it known that I, MARTIN HALLER, of Ann Arbor, in the county of Washtenaw and State of Michigan, have invented a new and Improved Ear-Piercing Apparatus, of which the following is a specification.

Figure 1 is a longitudinal section of the tubular cutter shown in place on the holder. Fig. 2 is a side view, partly in section, of the tubular cutter enlarged. Fig. 3 is a side view of the forward part of the holder enlarged. Fig. 4 is a side view, partly in section, of the forceps. Fig. 5 is a plan view of the forward arm of the forceps. Fig. 6 is a plan view of the forward part of the rear arm of the forceps. Fig. 7 represents a wire for clearing the tubular cutter.

The object of this invention is to furnish an apparatus for piercing ears for ear-rings so constructed as to facilitate the operation, lessen the pain, and allow the hole to be made in exactly the desired spot.

The invention consists in constructing an ear-piercing apparatus of a tubular cutter having notches in the rear end, a holder having a shoulder for the rear end of the cutter to rest against and projections to turn the cutter, and the forceps for holding the ear having a hole in one arm to receive a cork or rubber cutting-block and a notch in the other arm to receive and serve as a guide to the cutter, as will be hereinafter fully described.

A represents the cutter, which is made in tubular form, with a sharp cutting-edge upon its forward end, and with notches B in the opposite parts of the edge of its rear end. The holder is made with its forward part, C, of such a size as to fit into the tubular cutter A, with a shoulder, D, for the rear end of the cutter A to rest against, and with two projections, E, to enter the notches B of the cutter A, so that the said cutter may be turned to make a cut by turning the holder. The holder C D E is provided with a handle, F, for convenience in operating it.

G are the forceps, which are made like tweezers. In the end of the rear arm of the forceps G is formed a hole to receive a block, H, of cork or rubber, for the edge of the cutter A to strike against when making a cut. I prefer to make the block H of rubber, as being less liable to injure or dull the edge of the cutter A.

In the end of the forward arm of the forceps G is formed a notch, I, of such a size as to receive the cutter A and serve as a guide in making a cut. The notch I is over the forward part of the cutting-block H, so that by turning the said block partly around a new surface may be obtained for the cutter A to cut against.

J represents a wire for removing the piece of the ear cut out by the cutter A from the said cutter.

In using the apparatus the exact spot where the hole is to be made is marked with ink upon the forward side of the lobe of the ear, and the lobe of the ear is grasped with the forceps G in such a manner that the ink-spot may show through the notch I. The cutter A, placed upon the holder C D E F, is then placed in the notch I and forced through the lobe of the ear with a slight turn, cutting a hole through the ear of the size of the cutter A. The forceps and holder are then taken away, the cutter is cleared with the wire J, and the ear-wire is inserted through the cavity of the cutter, and the said cutter is withdrawn.

With this apparatus the operation of piercing the ear is much less painful than when the piercing is done in the usual manner, and the ear-wire being passed through the cutter A is inserted without pain. Another advantage of the apparatus is that the ear-wire is loose while the ear is healing, and the ear is thus much less painful while healing than when the said ear-wire is tight, as is the case when the ear is pierced in the usual manner.

Having thus described my invention, what I claim as new, and desire to secure by Letters Patent, is—

1. An ear-piercing apparatus constructed substantially as herein shown and described, consisting of the tubular cutter A, having notches B in its rear end, the holder C F, having shoulders D and projections E, and the forceps G, having a hole in one arm to receive a cork or rubber block, H, and a notch, I, in the other arm to receive the cutter A, as set forth.

2. In an ear-piercing apparatus, the tubular cutter A, having notches B in its rear end to receive projections upon the holder, substantially as herein shown and described, whereby the cutter can be forced through the ear with a turning movement, as set forth.

3. In an ear-piercing apparatus, the holder C, constructed with a shoulder, D, and projections E, substantially as herein shown and described, to adapt it to receive and operate the tubular cutter A, as set forth.

MARTIN HALLER.

Witnesses:
OTTMAR EBERBACH,
E. GRUNER.